United States Patent Office 2,895,955
Patented July 21, 1959

2,895,955
TRICARBOCYANINE INFRARED ABSORBING DYES

Donald W. Heseltine and Leslie G. S. Brooker, Rochester, N.Y., assignors to Eastman Kodak Company, Rochester, N.Y., a corporation of New Jersey No Drawing. Application June 5, 1957
Serial No. 663,578

4 Claims. (Cl. 260—240.5)

This invention relates to tricarbocyanine dyes containing a benz[e]indole nucleus which have useful infrared absorbing properties.

The tricarbocyanine dyes of our invention can advantageously be represented by the following general formula:

(I)

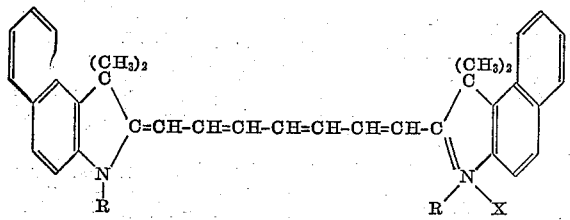

wherein R represents an alcohol radical, i.e., an alkyl group (substituted or unsubstituted), containing not more than 4 carbon atoms, such as methyl, ethyl, n-butyl, β-sulfoethyl, 4-sulfobutyl, 3-sulfobutyl, etc., and X represents an acid radical, such as chloride, bromide, iodide, p-toluenesulfonate, etc.

The dyes of Formula I above can be prepared by condensing a cyclammonium quaternary salt selected from those represented by the following general formula:

(II)

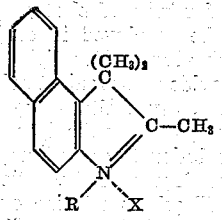

wherein R and X each have the values given above with glutaconic-aldehyde dianilide hydrochloride in the presence of a carboxylic anhydride, such as acetic, propionic, butyric, etc., anhydrides. This general method of preparation of tricarbocyanine dyes is described in Keyes U.S. Patent 2,251,286, dated August 5, 1951.

As shown in Patent 2,251,286, the first step in the condensation involves the formation of an acylanilido derivative. In some instances, improved yields can be obtained by isolating this acylanilido compound and reacting it with a second molecule of the compound of Formula II.

Heat accelerates the condensations, and since the carboxylic anhydrides generally employed as condensing agents are liquids, it is convenient simply to reflux the reaction mixture until sufficient reaction has occurred. If desired, an inert diluent can be employed in the condensations, particularly where the reaction is performed in two steps and the acylanilido compound is separated from the reaction mixture prior to reaction with a second molecule of the compound of Formula II. When performing the reaction in two steps, such diluents as ethanol, butanol, diethyl ether, etc., can conveniently be used. Basic condensing agents, such as organic tertiary amines or salts of weak acids, such as sodium acetate, etc., can be used.

The intermediates of Formula II above can conveniently be prepared by heating the compound of the following formula:

(III)

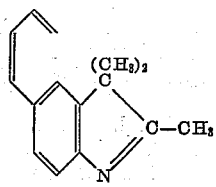

with a compound of the following general formula:

(IV)

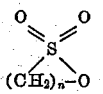

wherein $n$ represents a positive integer of from 3 to 4, to provide those compounds wherein R of Formula II represents a sulfoalkyl group. The reaction of the compound of Formula III with those of Formula IV provides cyclammonium quaternary salts containing no combined acid radical. These products are generally known as betaines. The methylene group of the compounds of Formula IV can carry simple substituents, such as methyl groups, ethyl groups, etc.

The following examples will serve to illustrate more fully the manner whereby we practice our invention.

Example 1.—1,1,3,3,3',3'-hexamethyl-4,5; 4',5'-dibenzoindotricarbocyanine chloride

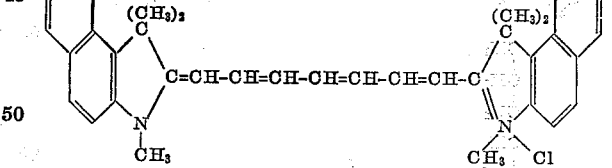

1,1,2-trimethylbenz[e]indole (10.45 g., 2 mols.) and methyl p-toluenesulfonate (10.2 g., 2 mols. plus 20%) were mixed and heated on the steam bath for thirty minutes and were then allowed to stand at room temperature overnight. Glutaconicaldehyde dianilide hydrochloride (7.2 g., 1 mol.) and finely powdered fused sodium acetate were then added to the quaternary salt. Boiling acetic anhydride (100 m.) was then added and the reaction mixture heated under reflux for twenty minutes. The reaction mixture was then poured with stirring into one liter of cold water containing sodium iodide (10 g.). After the acetic anhydride had decomposed, the crude dye was collected on a filter and washed with water. The crude product was then dissolved in hot acetone, filtered and the filtrate treated with sodium iodide (10 g.). After chilling overnight the iodide 6.5 g. (41%) was collected on a filter and dried. The dye iodide was converted to the dye chloride using silver chloride in the usual way (as described in U.S. Patent 2,245,249). The yield of the conversion was 90% and the chloride had M.P. 199–200° C.

*Example 2.—3,3,3',3'-tetramethyl-1,1'-di(4-sulfobutyl)-4,5,4',5'-dibenzoindotricarbocyanine iodide disodium salt*

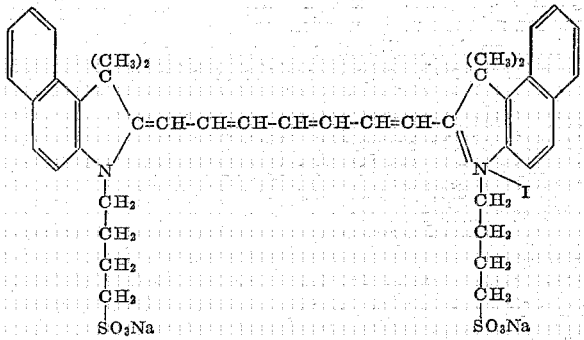

Anhydro-2-(6-acetanilido-1,3,5 - hexatrienyl)-3,3 - dimethyl-1-(4-sulfobutyl)-4,5-benzopseudoindolium hydroxide (5.42 g., 1 mol.) and anhydro-2,3,3-trimethyl-1-(4-sulfobutyl)-4,5-benzopseudoindolium hydroxide (3.45 g., 1 mol.) were dissolved in ethyl alcohol (30 ml.) and triethylamine (1.4 ml., 1 mol.) was added. The mixture was then heated under reflux for fifteen minutes. After cooling, the crude dye was thrown out of solution by the addition with stirring of ether (100 ml.). The ether was decanted and the residue dissolved in methyl alcohol (100 ml.), filtered and treated with sodium iodide (5 g.) dissolved in methyl alcohol (25 ml.). The crude dye was collected on a filter, washed with acetone and dried. The crude dye was purified by dissolving in methanol and precipitating by the addition of alcoholic sodium iodide. The crude product was then twice refluxed with two liter portions of acetone and filtered from the hot suspension. The yield of purified dye was 7.5 g. (83%) M.P. 243–5° C. dec.

*Example 3.—Anhydro-2-(6-acetanilido - 1,3,5 - hexatrienyl)-3,3-dimethyl-1-(4 - sulfobutyl)-4,5 - benzopseudoindolium hydroxide*

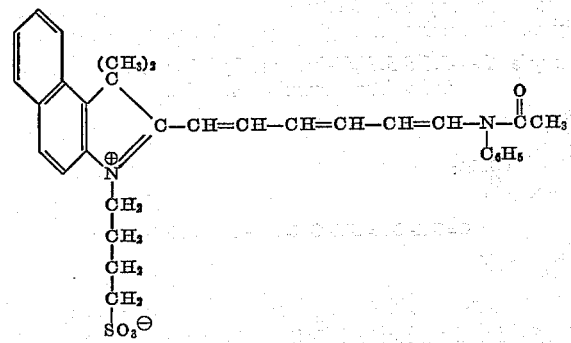

Anhydro-2,3,3- trimethyl-1-(4 - sulfobutyl)-4,5-benzopseudoindolium hydroxide (17.3 g., 1 mol.) and glutaconicaldehyde dianilide hydrochloride (15.6 g., 1 mol. plus 10%) were added with stirring to boiling acetic anhydride (100 ml.). The source of heat was removed and the stirring continued for thirty minutes. After chilling, the crystalline product was collected on a filter, washed with acetone and dried. The yield of product was 24.1 g. (90%) M.P. 168–70° C. dec.

*Example 4.—Anhydro-2,3,3-trimethyl-1-(4 - sulfobutyl)-4,5-benzopseudoindolium hydroxide*

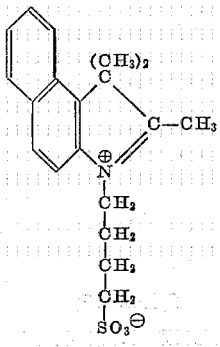

1,1,2-trimethylbenz[e]indole (20.9 g., 1 mol.) and 1,4-butanesultone (13.6 g., 1 mol.) were mixed and heated on an oil bath for two hours at 130° C. The solid cake was then ground under acetone, collected on a filter, washed with acetone and dried. The yield was 26.0 g., (71%). A sample recrystallized from methanol and acetone had M.P. 266–7° C. dec.

The compounds of our invention are useful in diagnosing certain circulatory disorders, particularly congenital heart defects. The utility of our compounds is based upon their property of absorbing strongly in the infrared at about 800 mµ while having very little or no absorption in the visible part of the spectrum. The dyes of our invention are readily dissolved in water and the aqueous solutions obtained can be injected into the blood stream and the passage of the dye through the circulatory system measured. The technique of observing the passage of the dye through the blood stream has been previously described in detail in the prior art. See, for example, "American Journal of Physiology," vol. 187, No. 3, December 1956. The quantity of dye injected into the blood stream is, of course, dependent upon the body weight of the subject. In general, about 0.1 mg./kilogram of body weight is sufficient.

The infrared absorbing dyes of our invention also have useful photographic properties, although they have little or no sensitizing action on ordinary silver halide emulsions. However, they do exhibit sharp absorption in the infrared region of the spectrum, and this property, in conjunction with their property of almost complete transmission in the visible region of the spectrum, makes possible their use in infrared photography. For example, the silver halide emulsions generally employed in infrared photography have sensitivity in the visible region of the spectrum, as well as in the infrared region of the spectrum. During the processing and handling of silver halide emulsions intended for infrared photography, the dyes of our invention can be employed in conjunction with a Wratten filter which absorbs blue light (e.g., a Wratten No. 12 filter) to provide a convenient safe-light. To prepare a suitable Wratten type filter using our new dyes, it is convenient to simply dissolve the dyes in distilled water, and add sufficient solution to an ordinary gelatin suspension, to provide the degree of absorption required, and then coat this "dyed" gelatin solution on a conventional support, such as glass, cellulose ester film, etc., and dry the coating.

The dyes of our invention can also be employed in color photography involving the use of multilayer, differentially sensitized emulsions where it is desired to remove infrared radiation. For this purpose, the dyers of our invention can be incorporated in the silver halide emulsion layers of the multilayer element, or they can be employed in a separate layer, such as an overcoating layer. The dyes of our invention are particularly useful for this purpose, since they do not have any substantial effect on the color balance of the multilayer element.

The term sulfo as used in the foregoing specification and in the following claims includes the —SO₃H group as well as the salt forms of this group. Typical salts of this group include the alkali metal salts (e.g., sodium, potassium, etc.), as well as ammonium and organic ammonium salts (e.g., triethylammonium, triethanolammonium, pyridinium, etc.). The compounds of Formula I above containing a sulfo substituent on the alkyl group have been found to be of outstanding importance and provide improved results over those obtainable with the simple, unsubstituted alkyl compounds. This is particularly true in using these compounds in diagnosing heart conditions, since certain dyes might have a tendency to precipitate from the blood stream and be of little value in determining the condition of the circulatory system. The dyes of our invention containing a sulfo group have been found to be particularly free of precipitation effects. When used in medical diagnosis, our compounds appear to have no adverse effects on the patient.

What we claim as our invention and desire to secure by Letters Patent of the United States is:

1. A water-soluble tricarbocyanine dye selected from those represented by the following general formula:

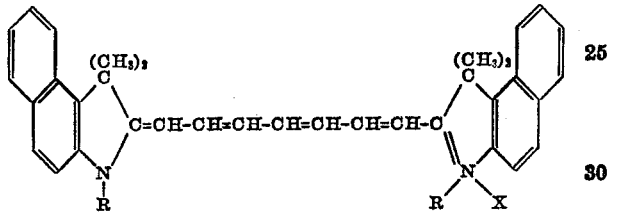

wherein R represents an alkyl group containing from 1 to 4 carbon atoms and X represents a non-toxic acid anion.

2. A water-soluble tricarbocyanine dye selected from those represented by the following general formula:

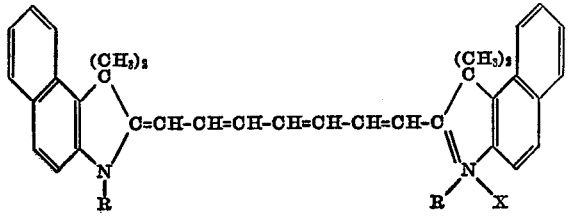

wherein R represents a sulfoalkyl group containing from 1 to 4 carbon atoms and X represents a non-toxic acid anion.

3. The tricarbocyanine dye represented by the following formula:

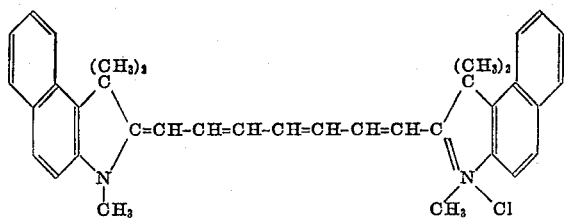

4. The tricarbocyanine dye represented by the following formula:

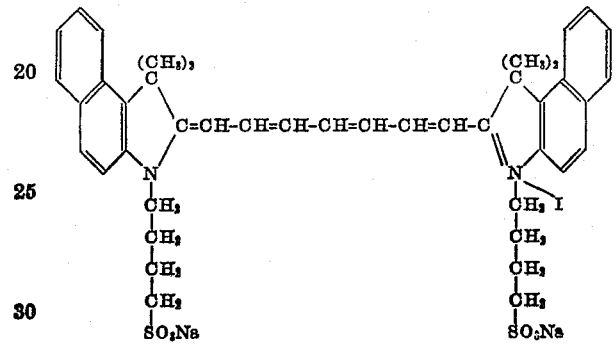

References Cited in the file of this patent

UNITED STATES PATENTS

| | | |
|---|---|---|
| 1,899,122 | Tobler | Feb. 28, 1933 |
| 2,104,064 | Zeh | Jan. 4, 1938 |
| 2,140,248 | Retter | Dec. 13, 1938 |

FOREIGN PATENTS

| | | |
|---|---|---|
| 499,967 | Germany | June 25, 1938 |
| 654,690 | Great Britain | June 27, 1951 |

OTHER REFERENCES

Brooker: Journal of the American Chemical Society, vol. 63, pp. 3192–3203 (1941).